United States Patent [19]

Muller et al.

[11] 4,010,658
[45] Mar. 8, 1977

[54] STEERING WHEEL HAVING FLEXIBLE RIM

[75] Inventors: George H. Muller, Ann Arbor; Lloyd R. Vivian, Jr., Birmingham, both of Mich.

[73] Assignee: Ford Motor Company, Dearborn, Mich.

[22] Filed: Dec. 19, 1975

[21] Appl. No.: 642,644

[52] U.S. Cl. .................................................. 74/552
[51] Int. Cl.² ...................... B62D 1/04; G05G 1/10
[58] Field of Search ............................ 74/491, 552

[56] References Cited

UNITED STATES PATENTS

| 2,596,784 | 5/1952 | Nagin | 74/552 |
| 2,810,301 | 10/1957 | Mathues | 74/552 |
| 2,814,211 | 11/1957 | Hoagg | 74/552 |
| 2,889,714 | 6/1959 | Romano | 74/493 |
| 3,321,996 | 5/1967 | Cardinale | 74/552 |
| 3,456,526 | 7/1969 | Brilmyer | 74/552 |

Primary Examiner—Leonard H. Gerin
Attorney, Agent, or Firm—Clifford L. Sadler; Keith L. Zerschling

[57] ABSTRACT

A steering wheel for a motor vehicle according to the present disclosure has a flexible rim with a spring metal core. The rim core comprises a flat annular leaf spring that lies in a plane perpendicular to the axis of rotation of the steering wheel. A pair of arcuate leaf springs overlay the annular leaf spring adjacent the outer ends of each of the spokes of the wheel whereby the stresses in the annular rim core where it is attached to the spokes are reduced when the rim is deflected.

8 Claims, 6 Drawing Figures

STEERING WHEEL HAVING FLEXIBLE RIM

BACKGROUND OF THE DISCLOSURE

The present disclosure relates to steering wheels for motor vehicles, and more particularly to a steering wheel having a flexible rim that is resiliently deflected under an impact load so as to absorb a portion of the load. The wheel of this patent is an improvement upon prior art steering wheels such as shown in U.S. Pat. Nos. 2,814,211, 3,321,996 and 3,456,526

BRIEF SUMMARY OF THE DISCLOSURE

A steering wheel is disclosed which has a hub, a pair of spokes attached to the hub and a resiliently deflectable rim attached to the spokes. The rim comprises a rim core having a flat leaf spring member of annular shape. A pair of arcuate leaf spring members are positioned on either side of the circular leaf spring member adjacent the outer end of each spoke to provide a reinforcement at the point the rim core is attached to the spokes. The circular leaf spring member lies in a plane perpendicular to the axis of rotation of the steering wheel.

The spokes of the steering wheel and the core of the rim are enclosed in a plastic covering both for cosmetic reasons and to provide gripping surfaces for the vehicle operator.

The orientation of the leaf springs of the rim core provide a rim that is resiliently deflectable under an impact load imposed upon the rim in a direction parallel to the axis of the steering wheel whereby a portion of the load is absorbed. Arranging the leaf springs as disclosed provides a rim structure which is rigid with respect to forces in the plane of the rim so that when the wheel is gripped by a vehicle operator and a force is applied for the purpose of turning the wheel, the rim will not flex to an out-of-round shape.

BRIEF SUMMARY OF THE DRAWINGS

The many objects and advantages of a steering wheel for a motor vehicle constructed in accordance with this invention will become apparent upon consideration of the following detailed discussion and the accompanying drawings, in which.

DETAILED DESCRIPTION OF A PREFERRED EMBODIMENT

Figure 1:
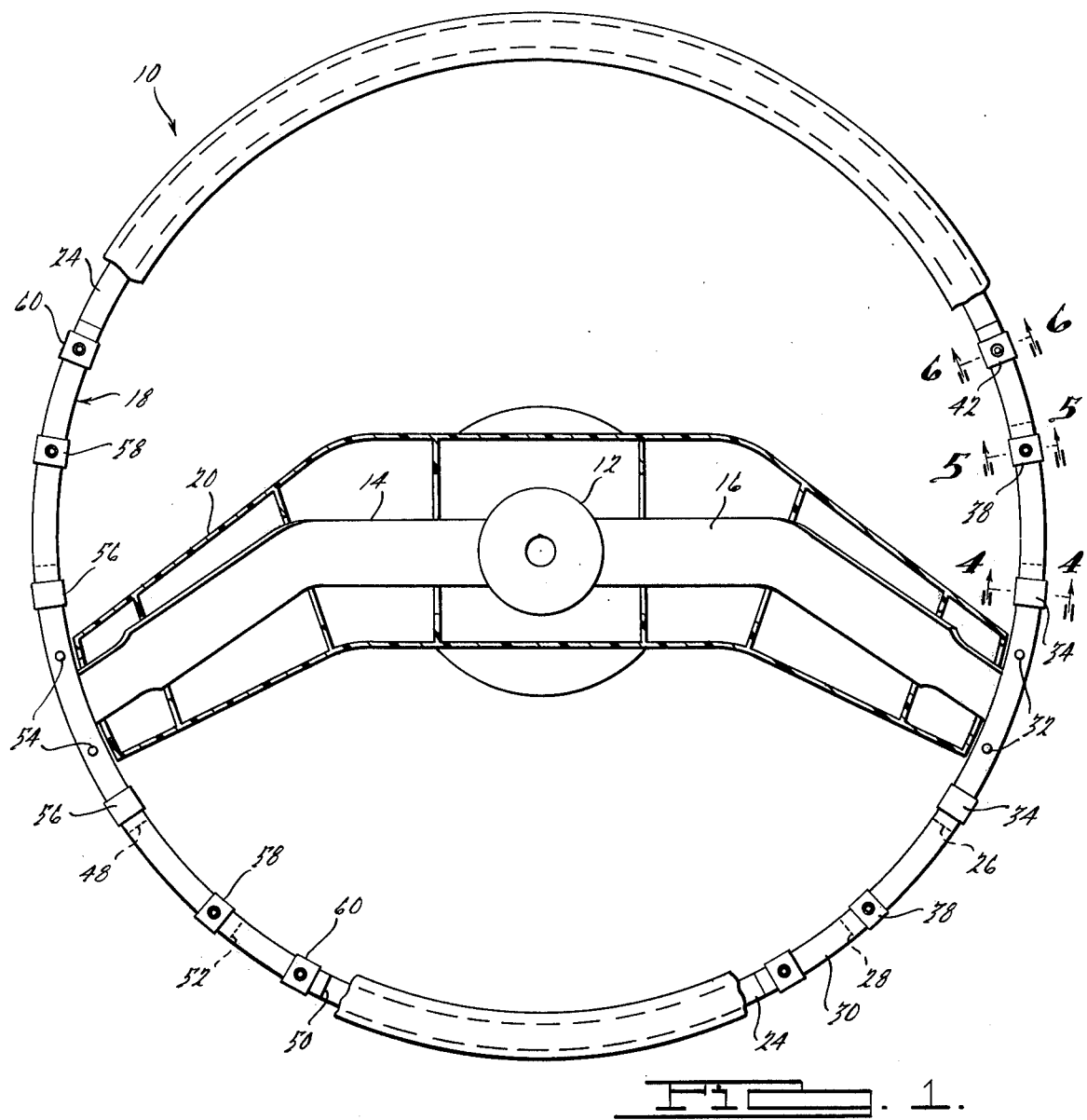
FIG. 1 is a plan view of a steering wheel according to a preferred embodiment of this invention.
Figure 2:
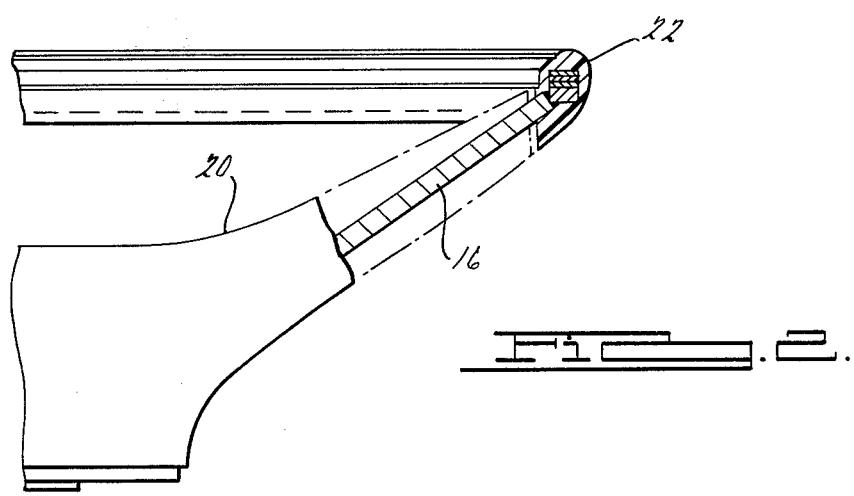
FIG. 2 is an elevational view, partly in section, of the steering wheel of FIG. 1 with a portion of the spoke covering broken away.

The presently preferred embodiment of a steering wheel for a motor vehicle in accordance with this invention is shown in the drawings. The steering wheel 10 of FIG. 1 includes a hub 12 constructed to be attached to a steering shaft. Left and right spokes 14 and 16 are welded to the hub 12. The outer ends of the spokes 14 and 16 are angled downwardly in dogleg fashion and are attached to a rim core assembly 18 that is rigid in the plane of the rim and is resiliently deflectable under an impact load in a direction parallel to the axis of rotation of the wheel. A plastic enclosure 20 covers the hub 12 and the spokes 14 and 16. A plastic enclosure 22 surrounds the rim core 18 and provides a hand grip for a motor vehicle operator.

Figure 3:
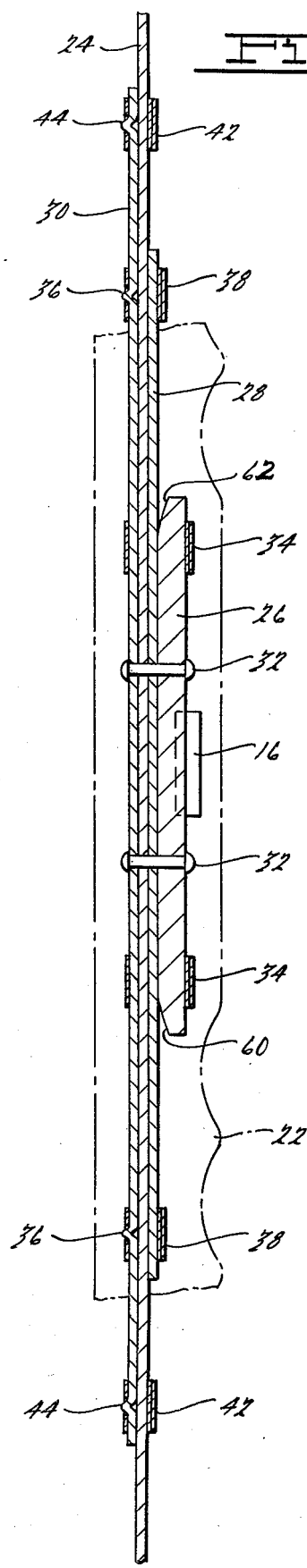
FIG. 3 is a sectional view showing the attachment of the steering wheel rim to one of the spokes.
Figure 6:
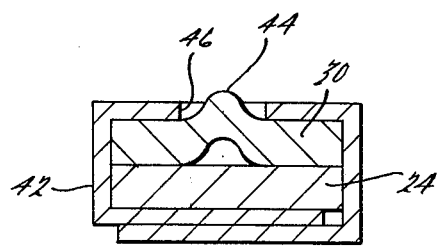
FIG. 6 is a sectional view of the rim core taken along section line 6—6 of FIG. 1.
Figure 5:
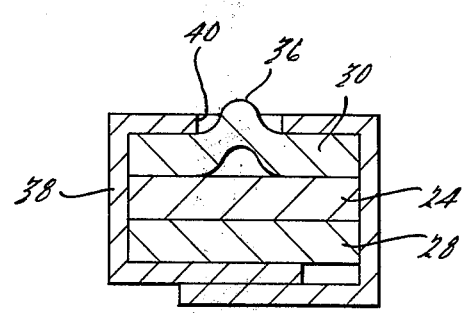
FIG. 5 is a sectional view of the rim core taken along section line 5—5 of FIG. 1.

More particularly, the steering wheel 10 has a rim core with a flat spring metal member 24 of circular shape. The circular spring member 24 has a rectangular cross section with a flat upper surface that lies in a plane perpendicular to the axis of rotation of the wheel 10. Referring to FIG. 3, a short arcuate shoe 26 is welded to the outer end of the spoke 16. An arcuate flat leaf spring member 28 rests upon the shoe 26 and engages the lower side of the circular core member 24. A second arcuate leaf spring member 30 rests upon the upper surface of the core member 24. The spring member 30 extends through a slightly greater arc than the spring member 28. A pair of rivets 32 extend through the spring members 28 and 30, through the circular spring member 24 and through holes in the supporting shoe 26 whereby the several spring members and the core member are rigidly secured to the outer end of the steering wheel spoke 16.

A pair of metal bands 34 encircle the shoe 26, the arcuate spring members 28 and 30 and the core member 24 near the outer ends of the shoe 26.

At a location near the ends of the lower arcuate leaf spring member 28, the upper leaf spring member 30 has protrusions 36 formed therein. A pair of metal bands 38 surround the arcuate leaf springs 28 and 30 and the circular spring member 24 near the ends of the lower leaf spring 28. The bands 38 are provided with openings 40 through which the projections 36 protrude. The fitting of the projections 36 in the openings 40 serve to locate the metal band 38 in proper relationship to the ends of the lower spring member 28 and to prevent accidental dislocation of these parts during the manufacture and use of the steering wheel.

A pair of bands 42 secure the ends of the upper arcuate spring 30 to the spring rim core 24. The upper spring member 30 is provided with projections 44 near its ends and the bands 42 have openings 46 that are in registry with the projections 44 of the spring 30. This interengagement serves to properly locate the bands 42 with respect to the ends of the upper spring 30. The bands 42 serve to maintain the upper spring 30 in engagement and proper alignment with the circular leaf spring member 24.

The outer end of the left spoke 14 is connected to the rim core assembly 18 in a similar fashion. A short shoe 48 is welded to the end of the spoke 14. An upper arcuate leaf spring member 50 is positioned on top of the circular spring 24 and a lower shorter arcuate leaf spring member 52 is positioned beneath the spring 24. The arcuate leaf springs 50 and 52 and the circular spring member 24 are secured to the shoe 28 by a pair of rivets 54. A first pair of encircling straps 56 surround the leaf spring members 50 and 52, the circular spring member 24 and the shoe 48. A second pair of straps 58 encircle the two arcuate leaf springs 50 and 52 and the circular spring member 24. A third pair of straps 60 encircle the arcuate leaf spring member 50 adjacent its ends and the circular spring 24.

As indicated earlier, the hub 12 and spokes 14 and 16 of the wheel 10 are enclosed in a fabricated plastic structure 20. A flexible plastic enclosure 22 is cast about the rim core assembly 18 and provides a surface that may be gripped by a vehicle operator.

OPERATION

Figure 4:
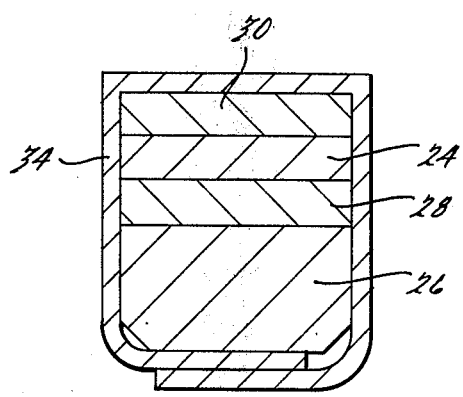
FIG. 4 is a sectional view of the rim core taken along section line 4—4 of FIG. 1.

The steering wheel 10 is adapted for use in a motor vehicle. As seen in FIG. 4, the circular spring member 24 and the arcuate leaf spring members 28 and 30 are of thin wide configuration. They each have a flat upper surface that is perpendicular to the axis of rotation of the steering wheel. A force in the plane of the rim of the steering wheel, such as a substantially tangential force exerted by a vehicle operator in turning the wheel, will be rigidly resisted by the circular spring member 24.

In the event an impact load is imposed upon the rim of the steering wheel 10 which is in a direction parallel to the axis of rotation of the wheel, the resiliency of the circular spring member 24 and the arcuate springs 28, 30, 50 and 52 will permit the steering wheel rim to flex and absorb a portion of the impact load. Different spring rates will be encountered depending upon the location where the impact load is imposed upon the rim. If the load strikes the rim at its upper center (as seen in FIG. 1) a lower spring rate will be encountered then if the load strikes the lower center portion of the rim or if the load is imposed upon the rim in an area where the arcuate springs 28, 30 or 50, 52 are located.

The short arcuate spring members 28, 30, 50 and 52 serve to distribute the loads in the circular spring 24 where the rim core assembly 18 is joined to the end of the spokes 14 and 16. By eliminating stress concentrations, the likelihood of the circular spring member 24 being broken or otherwise permanently deformed is substantially reduced. It will be noted that the ends of the shoe 26 have arcuate surfaces 62 adjacent the springs 28. These surfaces 62 reduce the possibility of stress concentrations during flexing of the rim core assembly 18.

The foregoing description presents the presently preferred embodiment of this invention. Details of construction have been disclosed for purposes of illustrating the invention and are not to be considered limits of the invention. Modifications and alterations may occur to those skilled in the art that will come within the scope and spirit of the following claims.

We claim:

1. A steering wheel for a motor vehicle having a hub, a spoke connected to said hub and rim means connected to said spoke;
   said rim means comprising a circular leaf spring core member;
   at last one arcuate leaf spring member positioned with its midportion adjacent the end of said spoke;
   securing means securing said core member and said arcuate member to the end of said spoke;
   said rim means being resiliently deflectable under an impact load imposed upon said rim means in a direction parallel to the axis of rotation of said wheel and said rim means being substantially rigid against deflection with respect to a force imposed upon said rim means in a plane perpendicular to the axis of said wheel.

2. A steering wheel for a motor vehicle comprising a hub;
   a spoke having its inner end secured to said hub;
   a rim core assembly secured to the outer end of said spoke;
   said rim core assembly comprising a circular leaf spring member having a circular shape in the plan view with a major flat upper surface in a plane perpendicular to the axis of rotation of said steering wheel;
   upper and lower arcuate leaf springs positioned on either side of said core member adjacent the outer end of said spoke;
   means securing said upper and lower arcuate leaf spring members and said circular leaf spring member to said spoke;
   said rim core assembly being resiliently deflectable under an impact load imposed upon said assembly in a direction parallel to the axis of rotation of said steering wheel and said rim core assembly being substantially rigid against deflection with respect to a force imposed upon said assembly in a plane parallel to said flat surface.

3. A steering wheel according to claim 2 and including:
   a rigid support shoe secured to the outer end of said spoke;
   means securing said upper and lower arcuate leaf spring members and said circular member to said shoe.

4. A steering wheel according to claim 2 and including:
   a rigid support shoe secured to the outer end of said spoke;
   means securing said upper and lower arcuate leaf spring members and said circular member to said shoe;
   band means encircling said arcuate springs, said circular member and said shoe.

5. A steering wheel according to claim 4 and including:
   hole and projection means constructed to provide interlocking engagement between one of said arcuate members and one of said bands.

6. A steering wheel for a motor vehicle comprising a hub;
   at least two spokes having their inner ends secured to said hub;
   a rim core assembly secured to the outer ends of said spokes;
   said rim core assembly comprising a circular leaf spring member having a circular shape in the plan view with a major flat upper surface in a plane perpendicular to the axis of said steering wheel;
   upper and lower arcuate leaf springs positioned on either side of said circular spring member adjacent the outer end of each of said spokes;
   a rigid support shoe secured to the outer end of each of said spokes;
   means securing said upper and lower arcuate leaf spring members and said circular member to said shoes;
   plastic covering means enclosing said rim core assembly;
   said rim core assembly being resiliently deflectable under an impact load imposed upon said assembly in a direction parallel to the axis of said wheel and said rim core assembly being substantially rigid against deflection with respect to a force imposed upon said assembly in a plane parallel to said flat surface.

7. A steering wheel for a motor vehicle comprising a hub;

left and right spokes having their inner ends secured to said hub;

a rim core assembly and attachment means securing said assembly to the outer ends of said left and right spokes;

said rim core assembly comprising a leaf spring member having a circular shape in the plan view with a major flat upper surface in a plane perpendicular to the axis of said steering wheel;

said rim core assembly having upper and lower arcuate portions defined between the centers of said attachment means;

one of said portions being an arc greater than 180° and the other of said portions being an arc less than 180° said rim core assembly being resiliently deflectable under an impact load imposed upon said assembly in a direction parallel to the axis of rotation of said wheel;

said rim core assembly having greater resiliency with respect to such a load imposed upon the center of said one portion than upon the center of said other portion.

8. A steering wheel for a motor vehicle comprising a hub;

a spoke having its inner end secured to said hub;

an annular rim core assembly secured to the outer end of said spoke;

said rim core assembly comprising a plurality of leaf spring members in flush engagement with each other;

each of said leaf spring members having a shape in cross section that includes two long parallel sides that are perpendicular to the axis of rotation of said steering wheel;

said rim core assembly being resiliently deflectable under an impact load imposed upon said assembly in a direction parallel to the axis of rotation of said steering wheel and said rim core assembly being substantially rigid against deflection with respect to a generally tangential force imposed upon said assembly by a vehicle operator while turning said steering wheel.

* * * * *